W. M. MARTIN & A. P. PETRI.
CHRONOMETRIC CAMERA SHUTTER OPERATING DEVICE.
APPLICATION FILED JUNE 24, 1907.
916,346.
Patented Mar. 23, 1909.
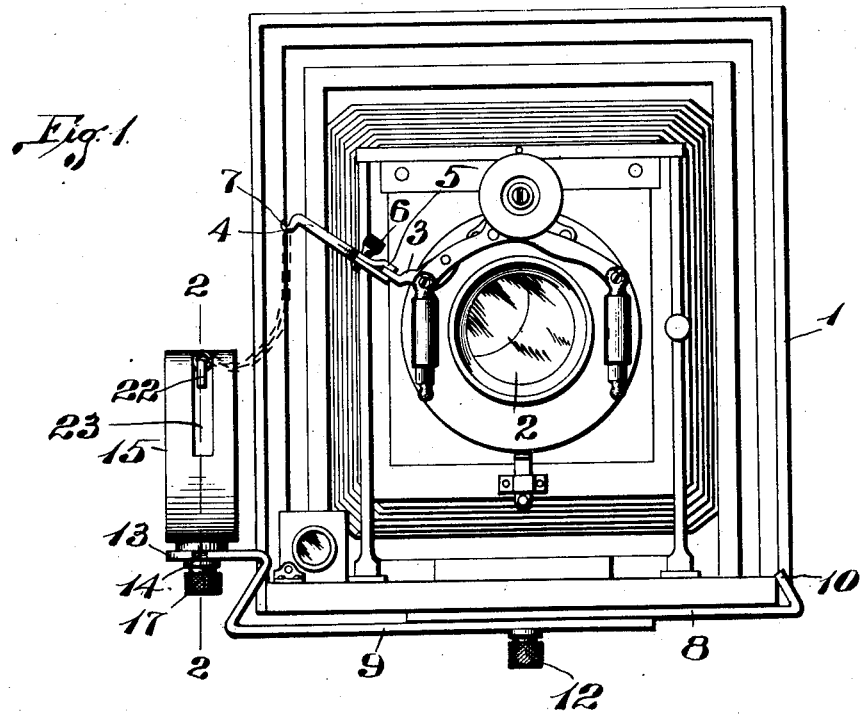
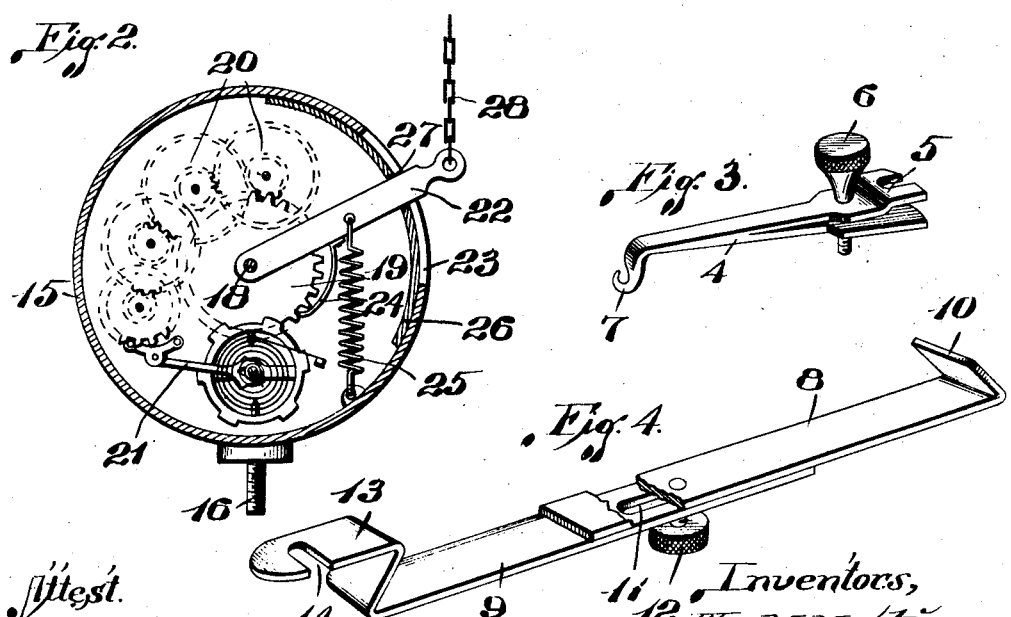
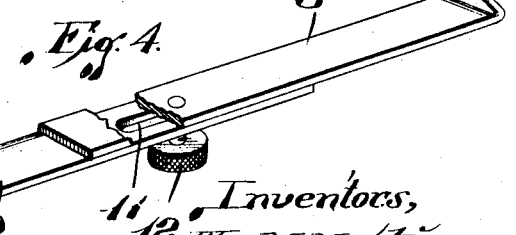
Inventors,
Wm. M. Martin,
and
Albert P. Petri

UNITED STATES PATENT OFFICE.

WILLIAM M. MARTIN AND ALBERT P. PETRI, OF ST. LOUIS, MISSOURI.

CHRONOMETRIC CAMERA-SHUTTER-OPERATING DEVICE.

No. 916,346.

Specification of Letters Patent.

Patented March 23, 1909.

Application filed June 24, 1907. Serial No. 380,445.

*To all whom it may concern:*

Be it known that we, WILLIAM M. MARTIN and ALBERT P. PETRI, both citizens of the United States, and residents of St. Louis, Missouri, have invented certain new and useful Improvements in Chronometric Camera-Shutter-Operating Devices, of which the following is a specification containing a full, clear, and exact description, reference being had to the accompanying drawings, forming a part hereof.

Our invention relates to a chronometric camera shutter operating device, our object being to provide simple means adapted to be adjustably and detachably arranged on a camera, and which operates chronometrically to open the shutter of the camera at a predetermined time after being set.

Our invention consists in a spring actuated train of gearing arranged in a suitable housing, and which latter is detachably arranged on the camera, an arm detachably fixed to the shutter operating trigger, and a flexible connection between the arm and the spring actuated gearing.

Our invention further consists in certain novel features of construction and arrangement of parts, which will be hereinafter more fully set forth, pointed out in the claims, and illustrated in the accompanying drawings, in which:—

Figure 1 is a front elevation of a camera with our improved shutter operating device in position thereon; Fig. 2 is an enlarged vertical section taken on the line 2—2 of Fig. 1; Fig. 3 is a perspective view of the finger which is detachably fixed to the shutter operating trigger; Fig. 4 is a perspective view of the adjustable clamp utilized for detachably fixing the housing carrying the chronometric mechanism.

Referring by numerals to the accompanying drawings:—1 designates the camera, 2 the lens thereof, and 3 the trigger, or finger, which actuates the shutter.

4 designates a finger which is detachably connected to the trigger 3, one end of said finger being bifurcated, as designated by 5; and passing through said bifurcated end is a thumb screw 6, which draws the bifurcated ends of the finger together so as to clamp on the end of the trigger 3; and formed on the opposite end of this finger 4 is a hook 7.

A clamp which is detachably connected to the camera 1 comprises a pair of narrow plates 8 and 9, the outer end of the plate 8 being bent upward to form a hook 10; and passing through a slot 11 formed in the plate 9 is a set screw 12, which enters the plate 8, and thus rigidly connects said plates 8 and 9. The left hand end of the plate 8 is bent upward, and thence outward in a horizontal plane, as designated by 13; and formed in said portion 13 is a slot 14.

15 designates a housing, with the under side of which is formed integral a screw threaded shank 16, which latter passes through the slot 14 and receives a thumb nut 17, thus detachably connecting the housing to the plate 9 of the clamp. Arranged in the center of the housing 15 is a shaft 18, on which is fixed a pinion 19, and which is in mesh with a small pinion at the end of a train of gearing 20, and at the opposite end of said train of gearing is arranged an escapement 21, of any ordinary construction. Loosely mounted on the shaft 18, adjacent the pinion 19, is a lever 22, which extends through a slot 23 formed in the side of the housing 15, and fixed to the under side of this lever 22 is a spring pawl 24, the point of which engages the teeth of the pinion 19. Secured to the inside of the housing 15 is one end of a retractile coil spring 25, the opposite end being fixed to the central portion of the lever 22. A segmental plate 26 is arranged against the inner face of the housing 15 so as to close the opening 23 therein, and formed in the center of this plate is an opening 27, through which the lever 22 projects. Fixed to the outer end of the lever 22 is one end of a flexible connection, such as a chain 28, the opposite end portion of which is adapted to be detachably connected to the hook 7 on the finger 4.

When our improved attachment is arranged upon a camera, the finger 4 is clamped to the end of the shutter operating trigger 3, and the housing 15 is arranged at the side of the camera by adjusting the clamp, comprising the plates 8 and 9, and locking the same together by means of the set screw 12. The chronometric mechanism within the housing 15 is now set for operation by elevating the lever 22, which action expands and stores power in the coil spring 25; and when the lever 22 is raised, the point of the spring pawl 24 successively engages the teeth of the pinion 19; and, in so doing, gives an audible signal by clicking, thus providing for the timing of the actuation of the device.

For instance, each tooth may represent a division of time, and thus the operator can regulate the period of time at which the mechanism actuates the shutter by varying the height to which the lever 22 is elevated. For instance, each tooth may represent a period of ten seconds, and if the lever 22 be elevated so that the point of the pawl passes four teeth, the shutter will then be actuated at the expiration of forty seconds after the chronometric mechanism has been set. After the mechanism has been set for operation, the power stored in the coil spring 25 exerting a downward pull necessarily imparts slow rotary motion to the pinion 19, owing to the engagement of the pawl 24 with the teeth of said pinion, and the speed at which the pinion 19 travels is governed and regulated by the escapement 21, which is driven from said pinion 19 by the train of gearing 20.

When the device is set for operation, the lever 22 is at its lowermost limit of movement against the lower end of the slot 23, and before engaging the upper portion of the chain on the hook 7, the finger 4 is moved downward to its lower limit of movement, after which the upper portion of the chain is engaged on the hook 7, with said chain in a taut condition, after which the lever 22 is moved upward the desired distance, and at the same time the end of the finger 4 moves upwardly a short distance until the trigger 3 resumes its normal position; but the upward movement of the finger is somewhat less than the corresponding movement of the lever 22, and thus the chain is loose or slack when the device is set, and which slack is taken up by the reverse or downward movement of the lever 22. The lever 22 moving downward causes the chain 28 to become taut, and, as soon as this action takes place, the downward pull of the lever will be exerted on the outer end of the finger; and, as a result, the trigger 3 will be actuated to open the shutter.

Our improved device is applicable for all forms of cameras having automatic shutters, and nearly all makes of hand cameras, is readily attached or detached, can be quickly and conveniently set for use, and provides simple means whereby the operator of the camera can have ample time to get into position adjacent the object being photographed before the exposure is made.

We claim:—

1. The combination with a camera and its shutter, of chronometrically operated means detachably arranged on the camera adjacent the shutter, and a chain forming a connection between the shutter trigger and the chronometrically operated means.

2. The combination with a camera and its shutter, of chronometrically operated means positioned on the camera adjacent the shutter, and a chain connecting a movable portion of the chronometrically operated means and the shutter releasing trigger.

3. The combination with a camera and its shutter, of chronometrically operated means arranged adjacent the camera, a finger detachably connected to the shutter releasing trigger, and a chain connecting a movable portion of the chronometrically operated means and the end of the finger.

4. The combination with a camera and its shutter, of a clamp detachably arranged on the camera, chronometrically operated means detachably arranged on the clamp, and a chain connecting the shutter releasing trigger and a movable portion of the chronometrically operated means.

5. A camera shutter operating device, comprising a chronometric mechanism, an arm actuated by said chronometric mechanism, and a chain connected to said arm and adapted to be connected to the camera shutter.

6. The combination with a camera and its shutter, of an arm detachably connected to the shutter releasing trigger, a hook formed on the end of said arm, a chronometric mechanism, an arm actuated by said chronometric mechanism, and a chain connected to said arm and to the hook on the arm carried by the shutter releasing trigger.

In testimony whereof, we have signed our names to this specification, in presence of two subscribing witnesses.

WILLIAM M. MARTIN.
ALBERT P. PETRI.

Witnesses:
M. P. SMITH,
E. L. WALLACE.